(12) United States Patent
Berkey et al.

(10) Patent No.: US 6,418,757 B1
(45) Date of Patent: Jul. 16, 2002

(54) METHOD OF MAKING A GLASS PREFORM

(75) Inventors: George E. Berkey, Pine City; Polly W. Chu, Painted Post; Carl E. Crossland, Campbell; Lisa A. Moore, Corning; Gang Qi, Painted Post; John W. Solosky, Hammondsport, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/318,316

(22) Filed: May 25, 1999

Related U.S. Application Data

(60) Provisional application No. 60/087,224, filed on May 29, 1998.

(51) Int. Cl.[7] .................................................. C03B 37/02
(52) U.S. Cl. .............................. 65/430; 65/435; 65/477; 65/108; 65/419; 65/439
(58) Field of Search ........................... 65/435, 439, 477, 65/108, 430, 419

(56) References Cited

U.S. PATENT DOCUMENTS

| | | | | |
|---|---|---|---|---|
| 2,269,459 A | * | 1/1942 | Kleist | 65/108 |
| 3,652,248 A | * | 3/1972 | Loxley et al. | 65/439 |
| 4,289,522 A | | 9/1981 | Bailey et al. | 65/144 |
| 4,453,961 A | | 6/1984 | Berkey | 65/3.12 |
| 4,631,079 A | * | 12/1986 | Clark et al. | 65/108 |
| 4,750,926 A | | 6/1988 | Berkey | 65/2 |
| 4,810,276 A | * | 3/1989 | Gilliland | |
| 5,236,481 A | | 8/1993 | Berkey | 65/3.11 |
| 5,314,517 A | | 5/1994 | Koening et al. | 65/2 |

* cited by examiner

Primary Examiner—James Derrington

(57) ABSTRACT

A method of making a glass article such as an optical waveguide preform is disclosed. The method comprises drawing a rod in at least two steps. In the first step an elongated, consolidated preform having an aperture therethrough is drawn to a reduced diameter preform. The second step involves drawing the reduced diameter preform into a rod, preferably at a lower temperature than the first step. The method substantially reduces the formation of inclusions in the glass article during drawing.

25 Claims, 1 Drawing Sheet

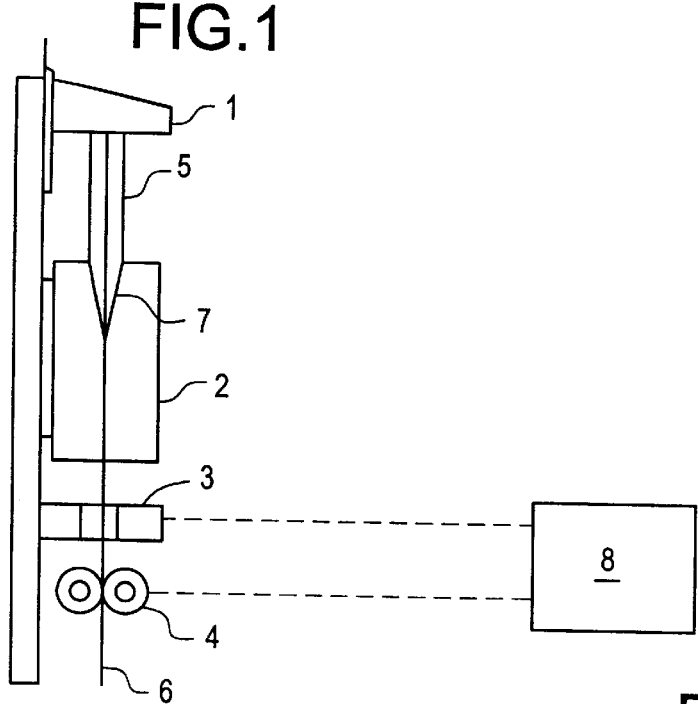
FIG. 1
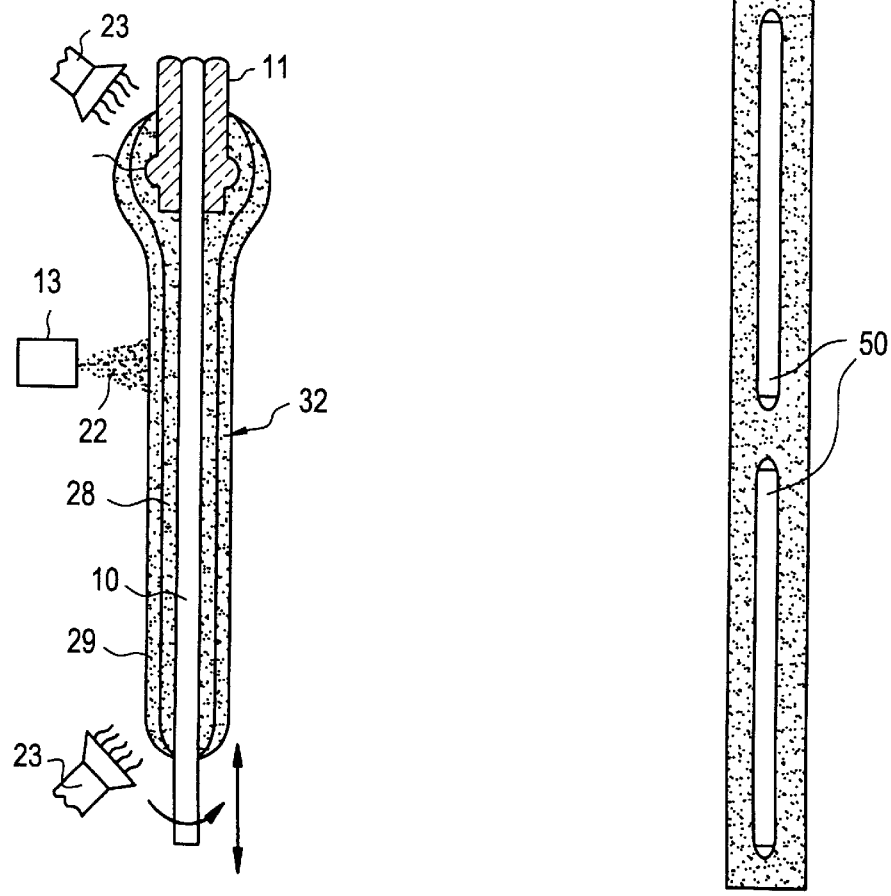
FIG. 2
FIG. 3

METHOD OF MAKING A GLASS PREFORM

This application is based upon the provisional application Ser. No. 60/087,224, filed May 22, 1998, which we claim as the priority date of this application.

BACKGROUND OF THE INVENTION

The present invention relates to an improved method of forming a glass preform from which optical fibers can be made. More particularly, this invention relates to the processing of optical waveguide core preforms to form optical waveguide canes or rods from which overclad preforms can be produced for drawing into optical waveguide fibers. This invention also relates to the manufacture of optical waveguide components, such as couplers and amplifiers, which require high quality glass.

One known outside vapor deposition (OVD) process for producing waveguide preforms involves forming a core soot preform by applying a first soot coating of uniform or radially varying composition to the surface of a rotating cylindrical mandrel or starting member. After formation of a core soot preform, the mandrel is typically removed, and the soot preform is consolidated and sintered to provide a consolidated core glass blank having an aperture therethrough. The core glass blank can then be drawn into an optical waveguide core rod, which is also referred to as a cane. The optical waveguide core rod can be overclad to form an overclad preform which is then drawn into optical waveguide fiber. This process, which involves separate manufacturing steps for the core preform and the overclad preform, enables better control of the refractive index profile of the resulting fiber and more efficient and lower cost manufacturing of optical fiber. For the manufacture of high quality preforms, particularly core preforms, the reduction and preferably the elimination of inclusions is of critical importance. Inclusions in the preform may be in the form of crystallites or gas bubbles, which are also referred to as seeds. Inclusions in the preform, particularly the core preform, adversely affect the quality of the fiber drawn therefrom. For example, inclusions can reduce fiber strength and increase attenuation in the waveguide fiber. An unacceptably high level of inclusions in a preform may cause the preform to be rejected before fiber is drawn therefrom, increasing manufacturing cost.

During the manufacture of the core glass blank, inclusion formation may occur during the step in which cane is drawn from a core preform. The problem of inclusion formation is particularly problematic with glass compositions containing an oxide such as aluminum oxide. U.S. Pat. Nos. 5,693,115 and 5,330,548 have suggested eliminating gas bubble inclusions in waveguide preforms by heating the preform in multiple stages or by heating the preform in a vacuum atmosphere or reduced atmosphere. Elimination of inclusions formed in a cane during drawing from the core preform, however, would require an additional processing step performed after the cane is drawn from core preform.

It would be advantageous to provide a process that eliminates or at least substantially reduces inclusions formed during the cane drawing process. Such a process would eliminate the need to perform additional processing steps to eliminate inclusions formed during the step of drawing the cane.

SUMMARY OF INVENTION

Accordingly, the present invention generally provides a method of forming a glass article such as a waveguide preform that is substantially free of inclusions such as gas bubbles and crystallites. The method comprises the steps of providing an elongated, consolidated glass preform having a longitudinal aperture therethrough and drawing the elongated, consolidated preform in at least two steps to provide a rod. The two-step draw process comprises a first step of heating at least one end of the elongated, consolidated glass preform at a first temperature and drawing the preform to provide a reduced diameter preform. The second step of the draw process involves a second step of heating at least one end of the reduced diameter preform at a second temperature and drawing the reduced diameter preform to provide a rod having a diameter less than the reduced preform. The method of the present invention also includes closing one end of the aperture and evacuating the aperture.

Preferably, the step of evacuating the aperture is performed during the second step of the two-step draw process. According to one embodiment of the present invention, during the first step air bubble inclusions coalesce to form continuous elongated air bubble inclusions. The method of the present invention is particularly useful for making optical waveguide fibers made from a glass comprising $Al_2O_3$, $GeO_2$ and $SiO_2$, which can be used as a host glass containing dopants such as erbium for making optical amplifiers.

Several important advantages will be appreciated from the foregoing summary. The principal advantage of the present invention is providing a waveguide core preform rod that is substantially free of inclusions, such as air bubbles and crystallites. A waveguide core preform free of such inclusions will require fewer processing steps to produce waveguide fiber, and waveguide fiber drawn therefrom will contain less scattering sites and thus have a lower attenuation. Additional features and advantages of the invention will be set forth in the description which follows, and may be learned by practice of the invention.

It is to be understood that both the foregoing general description and the following detailed description are exemplary and explanatory and are intended to provide further explanation of the invention as claimed. The accompanying drawings are included to provide a further understanding of the invention and illustrate one embodiment of the invention. In the drawings, like reference characters denote similar elements throughout the several views. It is to be understood that various elements of the drawings are not intended to be drawn to scale, but instead are sometimes purposely distorted for the purposes of illustrating the invention.

BRIEF DESCRIPTION OF THE DRAWINGS

FIG. 1 is a schematic representation of a typical apparatus used to manufacture cane or rod from a core preform;

FIG. 2 illustrates the application of coatings of glass particles to a mandrel to form a waveguide preform; and FIG. 3 illustrates a core preform that has been drawn to a reduced diameter having a longitudinal aperture containing elongated seeds.

DETAILED DESCRIPTION

Reference will now be made in detail to a present preferred embodiment of the invention, an example of which is illustrated in the accompanying drawings.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have a higher index of refraction than the cladding for proper operation, the core glass may desirably be formed of the same type used for the cladding and doped with a small amount of some other material to slightly increase the refractive index thereof.. For example, if pure fused silica is used as the cladding glass, the core glass can consist of fused silica doped with a material to increase its refractive index.

Many suitable materials have been used as a dopant alone or in combination with each other to increase the refractive index of fused silica. These include, but are not limited to, titanium oxide, tantalum oxide, aluminum oxide, lanthanum oxide, phosphorous oxide and germanium oxide. A core of germania doped fused silica is advantageously employed as a fiber core material since the resultant fiber exhibits low loss characteristics which extend to around 1600 nm. The cladding may be pure fused silica or silica doped with an oxide in an amount sufficient to lower the refractive index of the cladding below the core refractive index. The cladding could be doped with an oxide such as boron oxide which provides a refractive index slightly lower than that of pure fused silica and also provides the cladding layer with a somewhat higher thermal coefficient of thermal expansion than pure fused silica, thereby providing a better match between the coefficients of expansion of core and cladding materials.

Optical fiber amplifier glass typically comprises silica glass which includes dopants such as a rare-earth dopant, and an oxide such as aluminum oxide to prevent clustering of the dopant and to provide gain flatness. The core of amplifier glass usually includes a refractive index increasing dopant such as germania. Preforms made from such amplifier glasses are typically produced using known vapor deposition processes, for example, the outside vapor deposition (OVD) process.

FIG. 1 shows a typical apparatus for drawing an optical waveguide core rod from an optical waveguide soot core preform. A blank feed mechanism 1 lowers an elongated, consolidated glass preform or blank 5 into a furnace 2. The furnace 2 heats the lower end of the blank 5 to its softening temperature. A cane or rod drawing mechanism 4 draws cane or rod 6 from the softened end of the blank or preform 5. The diameter of the cane or rod 6 is measured by a measuring device 3. The drawing rate may be controlled by a computing device 8 to achieve cane with a predetermined diameter. Measuring device 3 is generally a non-contact, optical measurement to avoid damage to the pristine surface of the cane after it is drawn.

Elongated, consolidated preforms or blanks are made in accordance with well-known chemical vapor deposition techniques. U.S. Pat. Nos. 4,453,961, 4,486,212, and 5,236,481, the contents of which are all incorporated by reference herein, disclose exemplary processes for producing such preforms. For example, according to FIG. 1, the large diameter end of a tapered mandrel 10 is inserted into glass tube 11 having protrusions 12. Shims (not shown) can be used to secure tube 11 to mandrel 10 as disclosed in U.S. Pat. No. 4,289,517. Mandrel 10 is rotated and translated with respect to a burner 13 of the type disclosed in U.S. Pat. No. 4,165,223. Fuel gas and oxygen or air are supplied to a burner to produce an open flame which is emitted from the burner and a precursor, which may be a gas-vapor mixture or atomized droplets of the precursor. Reactant compounds emanate from the burner where they are oxidized in the flame to form glass particle stream 22 which is directed toward mandrel 10. Auxiliary burners 23 direct flames toward the end of the porous glass preform during deposition; the use of auxiliary burners is taught in U.S. Pat. No. 4,810,276. Dopant may be incorporated into the preform during the deposition process. Alternatively, dopant may be incorporated into the preform during the consolidation of the porous preform as described in U.S. Pat. No. 5,236,481.

After deposition of particulate soot material is completed to form a soot core preform, the mandrel may be removed from the assembly by pulling it out through the tubular handle, leaving a longitudinal aperture through the soot preform. The steps of drying and consolidating the soot preform may be performed in accordance with the teachings of U.S. Pat. Nos. 4,125,388 and 5,236,481 the contents of which are both incorporated herein by reference.

Applicants have discovered that the method of the present invention, which involves drawing the core preform into a core rod or cane in at least two steps, is particularly useful in making core rods from core preforms for optical waveguide fiber amplifiers. Such amplifier fibers typically comprise a silica host glass, in which the core contains a refractive index increasing dopant such as germania. The host glass also preferably contains alumina dopant to prevent clustering of the amplification dopant, such as erbia, and to provide amplifier gain flatness.

However, glass preforms that contain an oxide such as $Al_2O_3$, particularly preforms containing silica, germania and alumina, are susceptible to inclusion formation during the step of drawing the core rod. As used herein, inclusions mean both crystallite inclusions, which are precipitated crystallites of an oxide phase such as alumina, as well as gas bubble inclusions. In addition, gas bubble inclusions contained in preforms prior to performing the step of drawing the glass rod may have a tendency to grow and multiply during glass rod drawing step. Such inclusions are problematic when formed during the step in which the core rod is drawn because such inclusions in waveguide fibers produced from core rods provide scattering sites which degrade the optical characteristics of the waveguide fiber. Large gas bubbles, which are also referred to as seeds, make subsequent fiber processing difficult and even impossible. Although seeds can be reduced by an additional subsequent heat treatment step, the seeds are not always completely eliminated, and some seeds may reappear during the fiber drawing step. A subsequent heat treatment step may also promote the unwanted formation of crystals such as cristobalite and mullite, especially in preforms containing relatively high amounts of alumina. Applicants have discovered that performing the core rod draw process in two steps, inclusions, particularly seeds can substantially reduce and in some cases eliminate inclusions in the core rod and fiber produced therefrom.

According to one embodiment of the present invention, fiber amplifier core preforms are made by known OVD techniques by depositing silica, germania, and rare earth dopant particles on a rotating mandrel. An exemplary apparatus for performing the deposition step is shown in FIG. 2. In one embodiment the rare earth dopant comprises erbium doped at a level of about 150 to 1000 ppm. Er $(FOD)_3$ $(Er(C_{30}H_{30}F_{21}O_6)_3)$ can be used as a source material for the erbium, which can be melted in a bubbler at about 135° C. to about 160° C. and delivered to the reaction site using a carrier gas such as argon.

The silica and germania precursors can be silicon or germanium halides, for example, $SiCl_4$ and $GeCl_4$, although it will be understood that non-halide source materials can be utilized as well. The alumina source material can be $AlCl_3$ or $Al(HFA)_3$ (aluminum hexafluoroacetylacetonate), which can be sublimed or melted in a bubbler at about 125° C. to about 160° C., using a gas such as argon or oxygen to carry the reactant to the burner for combustion.

The amount of germania in the core preform will depend upon the desired refractive index profile of the core of the fiber made therefrom. A germania content of about 4% to about 25% by weight, preferably about 10% to about 20% by weight can be used to make erbium doped amplifier fiber. The alumina content of the core preform can vary from about 0.6% to about 20% alumina by weight, depending on the fiber amplifier requirements.

After laydown of the core preform, the mandrel or bait rod is removed to provide a soot preform with a longitudinal aperture therethrough, the preform is dried, and the preform is consolidated according to methods known in the art to provide an elongated, consolidated preform. A handle is attached to one end of the preform according to known methods. Preferably, the handle is a tubular, hollow handle having a flared end, such as the type shown in FIG. 4 of U.S. Pat. No. 5,236,481. Such a handle facilitates flowing gasses through the longitudinal aperture in the preform, and connecting a vacuum pump during the rod drawing step, which aids in closing the central aperture.

According to the method of the present invention, glass articles, such as optical waveguide core rod preforms, are made by first providing an elongated, consolidated glass preform having a longitudinal aperture therethrough by the methods described above. The elongated, consolidated preform is then drawn in at least two steps to provide a rod in an apparatus similar to the apparatus shown in FIG. 1.

The first step involves heating at least one end of the elongated, consolidated glass preform to a first temperature and drawing the preform to provide a reduced diameter preform. Typically, the diameter of the preform is reduced from about 30 to 50 mm to a reduced diameter of about 20 to 35 mm. The blank can be fed into the furnace at a rate of about 5–20 mm/min, and the cane or rod drawing mechanism draws cane at a rate of about 15–50 mm/min. Preferably, an inert gas such as argon is flowed along the aperture of the preform to remove any impurities on the surface of the aperture that can act as sites for forming inclusions. A flow rate of about 0.5 standard liters per minute is sufficient.

The second step involves heating at least one end of the reduced diameter preform to a second temperature and drawing the reduced diameter preform to provide a rod having a diameter less than the reduced diameter preform. Typically, the reduced diameter preform is reduced from about 20 to 35 mm diameter to about a 6 mm to 10 mm diameter rod. The blank can be fed into the furnace at a rate of about 5–20 mm/min, and the cane or rod drawing mechanism draws cane at a rate of about 15–50 mm/min. According to a preferred embodiment, the first temperature is higher than the second temperature. Preferably, during the second step, one end of the aperture is closed, most preferably the lower end of the aperture. The aperture is evacuated by connecting vacuum pressure, preferably about 0.03 torr to about 100 torr of vacuum pressure to the upper end of the tubular handle, the lower end of which is connected to the upper end of the central aperture of the reduced diameter preform. The method of the present invention provides a rod substantially free of inclusions, including crystallites and air bubble inclusions.

This invention is particularly useful for making optical waveguide preforms from glass containing an oxide such as $Al_2O_3$. For example, optical waveguide amplifier fibers comprised of glass including $Al_2O3$, $GeO_2$ and $SiO_2$ can be extremely difficult to manufacture because of inclusion formation, particularly seed formation during the step of manufacturing the core rod from a core preform. According to this invention, when the core rod preform is drawn in two steps in which the first step is performed at a higher temperature than the second step, inclusions are substantially reduced in the core rods. Reduction of inclusions in the core rod during the drawing step eliminates the need to add subsequent process steps to eliminate the inclusions, reducing manufacturing time and cost.

According to one embodiment of this invention, $Al_2O_3$ is present in an amount of about 0.5% to 20% and the $GeO_2$ is present in amount of about 5% to 20%. It is preferred that during the first step of drawing the reduced diameter preform, the furnace temperature is set above the liquidus temperature for the silica and alumina mixture. The liquidus temperature can be determined by referring to a phase diagram for silica and alumina, taking into account the weight percent alumina and silica in the composition. Generally blanks containing higher weight percentages of alumina and germania should be processed at lower temperatures during the drawing step. However, consolidated preforms containing large quantities of gas bubble inclusions may need to be processed at higher temperatures as described in more detail below.

For example, according to one embodiment of this invention, an erbium doped core preform containing about 2% to 4% alumina by weight, about 15% to 20% germania by weight, and about 76% to 83% silica by weight, the first step is preferably drawn with the glass at a temperature about 1675° C. to about 1800° C., with the furnace set at about 1850° C. to about 2050° C. Preferably, the second step of the process is performed so that the glass is at a temperature of about 1675° C. to 1800° C., with the furnace set to 1900° C. to about 2100° C.

In another embodiment, consolidated preforms that contain large quantities of gas bubble inclusions prior to the first step of drawing are drawn at elevated temperatures to cause the gas bubble inclusions to coalesce in a fewer number of larger gas bubble inclusions. For example, an erbium doped core preform containing about 7% to 8% alumina by weight, about 12% germania by weight, and about 80% silica by weight is preferably drawn with the furnace set above about 2150° C. to about 2300° C. so that the glass temperature is about 1800° C. to about 1950° C. during the first step. As mentioned above, normally a preform containing a higher weight percent of alumina and germania would be drawn at temperature lower than a blank containing a lower weight percentage of alumina and germania. However, blanks containing large quantities of seeds may need to be processed at higher temperature to cause the seeds to coalesce.

Referring now to FIG. 3, by performing the first draw step at these elevated temperatures, the seeds in the core preform preferably will coalesce to form a lesser number of larger seeds than contained in the original preform. Preferably the seeds will become long continuous seeds 50, and the seeds will coalesce along the aperture to form an aperture with a smooth inner surface having a circular cross-section. If the reduced diameter preform contains more than one long continuous seed, the reduced diameter preform preferably is cut into several sections to provide reduced diameter preforms having an open aperture on the upper and lower ends and through the preform. A fused silica tube is joined to the upper end of the preform and a handle having a flared end is joined to the tube. The second step of this embodiment involves drawing the reduced diameter preform into a rod at a temperature lower than the first step. Preferably, the temperature of the preform during this step is about 1600° C. to 1800° C., with the furnace set to about 1900° C. to about 2100° C., more preferably about 2000° C. The lower temperature prevents seeds from reforming. As discussed above, a vacuum pump is connected to the handle, and a vacuum is drawn at about 0.03 to about 100 torr to evacuate the aperture.

Thus, the present invention is directed to methods of making doped and undoped articles, including, but not limited to, single mode and multi-mode optical fiber waveguides and devices made therefrom, regardless of any specific description in the drawing or examples set forth herein. It will be understood that the present invention is not limited to use of any of the particular glass compositions or temperature ranges discussed herein. Indeed the invention is useful for eliminating inclusions in various other glass compositions, particularly those compositions that are susceptible to inclusion formation. For example, optical waveguide preforms prepared from heavy metal fluoride glasses are particularly susceptible to crystallite formation.

It will be apparent to those skilled in the art that various modifications and variations can be made to the method of the present invention without departing from the spirit or scope of the invention. Thus, it is intended that the present invention cover the modifications and variations of this invention.

What is claimed is:

1. A method of forming a glass article comprising the steps of:
    providing an elongated, consolidated glass preform having a longitudinal aperture therethrough;
    drawing the elongated, consolidated preform in at least two steps to provide a rod, the steps comprising
        a first step of heating at least one end of the elongated, consolidated glass preform in a furnace set to a first temperature and drawing the preform to provide a reduced diameter preform having a longitudinal aperture; and
        a second step of heating at least one end of the reduced diameter preform in the furnace set to a second temperature and drawing the reduced diameter preform to provide a rod having a diameter less than the reduced diameter preform;
    closing one end of the longitudinal aperture; and
    evacuating the longitudinal aperture.

2. The method of claim 1, wherein the step of evacuating the aperture is performed during the second step.

3. The method of claim 1, wherein the first temperature is higher than the second temperature.

4. A method of reducing crystallite and gas bubble inclusions in a glass article comprising the steps of:
    providing a glass preform having a longitudinal aperture therethrough;
    drawing the glass preform in at least two steps to provide a rod, the steps comprising
        a first step of heating at least one end of the glass preform in a furnace set to a first temperature and drawing the glass preform to provide a reduced diameter preform with a longitudinal aperture;
        a second step of heating at least one end of the reduced diameter preform in the furnace set to a second temperature and drawing the reduced diameter preform to provide a rod having a diameter less than the reduced diameter preform;
    closing one end of the aperture; and
    evacuating the aperture.

5. The method of claim 4, wherein the step of evacuating the aperture is performed during the second step.

6. The method of claim 5, wherein the first temperature is higher than the second temperature.

7. A method of making an optical waveguide preform from a glass comprising $Al_2O_3$, $GeO_2$ and $SiO_2$ comprising the steps of:
    providing an elongated, consolidated glass preform having a longitudinal aperture therethrough;
    drawing the elongated, consolidated glass preform in at least two steps to provide a rod, the steps comprising
        a first step of heating at least one end of the elongated, consolidated glass preform at a first temperature and drawing the preform to provide a reduced diameter preform having a longitudinal aperture; and
        a second step of heating at least one end of the reduced diameter preform at a second temperature and drawing the reduced diameter preform to provide a rod having a diameter less than the reduced diameter preform;
    closing one end of the aperture; and
    evacuating the aperture.

8. The method of claim 7, wherein on a weight percent basis, $Al_2O_3$ is present in an amount of about 0.5% to 20% and the $GeO_2$ is present in amount of about 5% to 20%.

9. The method of claim 8, wherein the first temperature is about 1675° C. to about 1800° C.

10. The method of claim 9, wherein the first temperature is about 1800° C. to about 1950° C.

11. The method of claim 8, wherein the first temperature is above the liquidus temperature for $Al_2O_3$ and $SiO_2$.

12. The method of claim 9, wherein the rod is substantially free from gas bubble and crystallite inclusions.

13. The method of claim 7, wherein the step of evacuating the aperture is performed during the second step.

14. The method of claim 10, wherein during the first step, air bubble inclusions coalesce to form continuous elongated air bubble inclusions along the aperture to form an aperture with a smooth inner surface.

15. The method of claim 1 further comprising the step of applying overclad to the rod to form an overclad preform.

16. The method of claim 15 further comprising the step of drawing the overclad preform into an optical waveguide fiber.

17. The method of claim 1 further comprising the step of drawing the rod into an optical waveguide fiber.

18. The method of claim 1 wherein the method provides a rod substantially free of inclusions.

19. The method of claim 1 wherein the preform comprises $Al_2O_3$, $GeO_2$ and $SiO_2$.

20. The method of claim 18 wherein on a weight percent basis, $Al_2O_3$ is present in an amount of about 0.5% to 20% and the $GeO_2$ is present in amount of about 5% to 20%.

21. The method of claim 20 wherein the first temperature is about 1675° C. to about 1800° C.

22. The method of claim 21 wherein the first temperature is about 1800° C. to about 1950° C.

23. The method of claim 20 wherein the first temperature is above the liquidus temperature for $Al_2O_3$ and $SiO_2$.

24. The method of claim 21 wherein the rod is substantially free from gas bubble and crystallite inclusions.

25. The method of claim 22 wherein during the first step, air bubble inclusions coalesce to form continuous elongated air bubble inclusions along the aperture to form an aperture with a smooth inner surface.

* * * * *

UNITED STATES PATENT AND TRADEMARK OFFICE
CERTIFICATE OF CORRECTION

PATENT NO. : 6,418,757 B1
DATED : July 16, 2002
INVENTOR(S) : Berkey, George E. et al.

It is certified that error appears in the above-identified patent and that said Letters Patent is hereby corrected as shown below:

Column 8,
Line 51, "The method of claim 18 wherein on a weight percent" should be -- The method of claim 19 wherein on a weight percent --

Signed and Sealed this

Thirteenth Day of May, 2003

JAMES E. ROGAN
*Director of the United States Patent and Trademark Office*